Patented May 21, 1940

2,201,692

UNITED STATES PATENT OFFICE 2,201,692

STABILIZATION OF SHORTENING

Donald P. Grettie, Chicago, Ill., assignor to Industrial Patents Corporation, Chicago, Ill., a corporation of Delaware No Drawing. Application August 12, 1936, Serial No. 95,632

10 Claims. (Cl. 99—163)

This invention relates to an improved process of treating edible fats and oils and more particularly to a process of stabilizing shortening products such as lard against rancidity.

One of the objects of the invention is to provide a method for stabilizing edible fats and oils such as lard, beef fat, hydrogenated cottonseed oil, and other vegetable and animal fats and oils against rancidity.

Another object of the invention is to provide as an article of commerce an improved shortening product stabilized against rancidity.

For the purpose of illustration, but not by way of limitation, the invention is hereinafter described as practiced with lard. As is well known, lard, like other of the animal and vegetable oils and fats, tends to become rancid when exposed to atmospheric oxygen. The effect of various substances of a chemical nature in promoting or retarding the tendency of fats and oils to become rancid has been studied by numerous investigators.

The present invention is based upon the discovery that the tendency of shortening to become rancid can be retarded by treatment with hydrogenated refined soya bean oil. This invention permits the stabilizing of lard against rancidity without in any way affecting the characteristic dry rendered or kettle rendered lard flavor which is considered desirable by the trade in such uses of lard as cracker manufacturing and the like where a carry over of the lard flavor to the end product is desirable.

In practice I have successfully stabilized lard by adding a small percentage of hydrogenated refined soya bean oil to lard in a molten condition. I have discovered that hydrogenated refined soya bean oil has a marked stabilizing action on lard.

I am aware that soya bean oil has been refined for use in various ways. However, I believe that my discovery of the stabilizing action of hydrogenated refined soya bean oil is a new and valuable discovery.

In my co-pending application entitled Fat stabilization, Serial No. 75,423, filed April 20, 1936, now Patent No. 2,052,289, I describe and claim my discovery of the stabilizing effect of crude soya bean oil and in that application point out that the stabilizing effect of crude soya bean oil is lost by refining. It will be seen, therefore, that although crude soya bean oil has antioxidant properties, as pointed out in my said co-pending application, the conventional refining process which normally involves treatment with caustic followed by steam deodorization so alters the characteristics of crude soya bean oil as to effectually destroy or remove the antioxidant properties which I have discovered are present in crude soya bean oil.

The present invention relates to the surprising discovery that although refining and deodorization destroy the antibodies in crude soya bean oil, the subsequent hydrogenation of refined soya bean oil endows the product with antioxidant properties.

The following tables set out data on actual tests carried out to demonstrate the value of the present invention in the stabilization of lard:

TABLE A

| Hours incubation at 70° C. | Milli equivalents of peroxide oxygen per kilo of fat | |
|---|---|---|
|  | 1 | 2 |
| 4 hours | 3 | 3 |
| 75 hours | 7.0 | 4 |
| 120 hours | °40.0 | 10 |
| 148 hours |  | 10 |
| 237 hours |  | 17 |
| 290 hours |  | 26 |
| 320 hours |  | °49 |

° Rancid.

1. Lard—not stabilized.
2. Lard containing 5% hydrogenated soya bean oil.

The foregoing data is a typical example of the stabilizing action of hydrogenated, refined soya bean oil on lard. The sample of hydrogenated soya bean oil used in these tests had a refractive index of 50.0° (Zeiss Butyro-Refractometer scale at 40° C.) and a melting point of 115° F. FAC.

The following data as obtained by accelerated peroxide oxygen keeping test is given as a further example of the stabilizing action of hydrogenated soya bean oil.

TABLE B

| Sample | Keeping quality peroxide oxygen method |
|---|---|
|  | Hours |
| Lard—control sample | 4 |
| Lard containing 6% hydrogenated soya bean oil | 19 |

The following examples will indicate the stabilizing action of hydrogenated soya bean oil on lard after incorporation into bakery products:

Example 1

| Sample | Time to become rancid when incubated at 70° C. |
|---|---|
| | Days |
| Pie crust made of lard—control | 2 |
| Pie crust made of lard containing 5% hydrogenated soya bean oil | 8 |

Example 2

| Sample | Time to become rancid when incubated at 70° C. |
|---|---|
| | Days |
| Pie crust made of lard—control | 1 |
| Pie crust made of lard containing 6% hydrogenated soya bean oil | 5 |

The following data indicates the effect of hydrogenated soya bean oil when mixtures of refined soya bean oil and lard are hydrogenated.

1. Lard—refined and hydrogenated from a refractive index of 49.8° (Zeiss Butyro-Refractometer scale at 40° C.) to 48.3°.

2. Lard containing 2% soya bean oil refined and hydrogenated from a refractive index of 49.85° (Zeiss Butyro-Refractometer scale at 40° C.) to 48.3°.

TABLE C

| Hours incubation at 70° C. | Milliequivalents of peroxide oxygen per kilo of fat | |
|---|---|---|
| | Sample 1 | Sample 2 |
| 66 | 35 | 2.0 |
| 90 | *57 | 4.0 |
| 140 | | 4.0 |
| 210 | | 5.0 |
| 238 | | 5.0 |
| 310 | | 9.0 |
| 333 | | 12.0 |
| 388 | | 22.0 |
| 484 | | *60 |

* Rancid.

As has been pointed out, the bodies having antioxidant properties present in crude soya bean oil are destroyed by caustic refining, but as is clear from the foregoing table, the subsequent hydrogenation of the ineffective refined oil develops antioxidant bodies.

It is particularly significant to note the stabilizing effect of the hydrogenated refined soya bean oil carried over into the pie crust baked with lard so stabilized as the shortening ingredient. This property of soya bean oil when used as a stabilizer is of considerable practical importance since most stabilizing agents do not carry over the antioxidant properties to the bakery product in which they are used.

Although by way of illustration I have discussed lard in describing my invention, it will be understood that the present invention is not limited to lard but comprehends edible vegetable and animal fats and oils adapted for use as a shortening and the like. The word "shortening" as used in this specification and the claims which follow will be understood to include edible animal and vegetable fats and oils such as lard, beef fat, hydrogenated cottonseed oil, and the like.

The term "hydrogenated refined soya bean oil" as used in the foregoing specification and in the following claims, designates oils expressed, extracted, or otherwise obtained from soya beans which have been subjected to the usual process of washing with a caustic solution, filtration, hydrogenation and deodorization.

I have found in practice that effective stabilization may be secured with varying amounts of hydrogenated refined soya bean oil. In most instances, it is sufficient to incorporate from 1 per cent to 10 per cent of hydrogenated refined soya bean oil in the shortening to be stabilized. It will be understood, of course, that some stabilization is secured with smaller amounts and that the effect is progressive as the amount is increased.

I claim:

1. The method of stabilizing lard against rancidity which comprises adding thereto and thoroughly incorporating therewith a quantity of hydrogenated refined soya bean oil.

2. The method of stabilizing lard against rancidity which comprises adding thereto and thoroughly incorporating therewith from 1 per cent to 10 per cent of hydrogenated refined soya bean oil.

3. The method of stabilizing lard against rancidity which comprises adding thereto and incorporating therewith hydrogenated refined soya bean oil which has been hydrogenated to about the consistency of the lard being treated.

4. As an article of commerce, a shortening product stabilized against rancidity consisting of 90 per cent to 95 per cent lard and a complement of hydrogenated refined soya bean oil.

5. As an article of commerce, a shortening product stabilized against rancidity consisting of a large proportion of lard and a complement of hydrogenated refined soya bean oil.

6. The method of stabilizing shortening against rancidity which comprises adding thereto and thoroughly incorporating therewith a quantity of hydrogenated refined soya bean oil.

7. As an article of commerce, a shortening product stabilized against rancidity consisting of a large proportion of shortening and a complement of hydrogenated refined soya bean oil.

8. The method of stabilizing shortening against rancidity which comprises adding deodorized hydrogenated refined soya bean oil thereto.

9. The method of stabilizing shortening against rancidity which comprises adding hydrogenated refined soya bean oil thereto and thereafter deodorizing the mixture at sufficiently high temperatures to destroy lecithin.

10. As an article of commerce, a shortening product stabilized against rancidity consisting of a large proportion of fat and a complement of deodorized hydrogenated refined soya bean oil.

DONALD P. GRETTIE.